(12) United States Patent
Veariel et al.

(10) Patent No.: US 11,383,416 B2
(45) Date of Patent: Jul. 12, 2022

(54) DEVICES, SYSTEMS, AND PROCESSES FOR PROCESSING POLYMERS

(71) Applicant: ExxonMobil Chemical Patents Inc., Baytown, TX (US)

(72) Inventors: Thomas R. Veariel, San Diego, CA (US); Yuet Meng Chu, Houston, TX (US); Costas G. Gogos, Anna Maria Island, FL (US); Chong Peng, Mason, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 748 days.

(21) Appl. No.: 15/767,895

(22) PCT Filed: Oct. 25, 2016

(86) PCT No.: PCT/US2016/058615
§ 371 (c)(1),
(2) Date: Apr. 12, 2018

(87) PCT Pub. No.: WO2017/105633
PCT Pub. Date: Jun. 22, 2017

(65) Prior Publication Data
US 2018/0297262 A1     Oct. 18, 2018

Related U.S. Application Data

(60) Provisional application No. 62/268,135, filed on Dec. 16, 2015.

(51) Int. Cl.
*B29C 48/69*      (2019.01)
*B29C 48/694*     (2019.01)
(Continued)

(52) U.S. Cl.
CPC ............. *B29C 48/694* (2019.02); *B29B 7/24* (2013.01); *B29C 48/256* (2019.02); *B29C 48/37* (2019.02);
(Continued)

(58) Field of Classification Search
CPC ..... B29C 48/694; B29C 48/256; B29C 48/37; B29C 48/08–10; B29C 48/04; B29B 7/24; B29B 9/10; B29K 2101/12; B29K 2105/0061; B29L 2007/008; B08J 3/02; B08J 3/20
(Continued)

(56) References Cited

U.S. PATENT DOCUMENTS 4,434,053 A * 2/1984 Osuna-Diaz ........... B01D 29/44
                                                          210/446
4,453,905 A    6/1984 Bennett
(Continued)

FOREIGN PATENT DOCUMENTS

CA      1133215 A    10/1982
DE     19728896 A     1/1999
(Continued)

*Primary Examiner* — Jeffrey M Wollschlager
*Assistant Examiner* — Xue H Liu
(74) *Attorney, Agent, or Firm* — ExxonMobil Chemical Patents Inc.-Law Department (57) ABSTRACT

Embodiments of an invention disclosed herein relate to devices, processes, and systems for processing one or more polymers.

22 Claims, 3 Drawing Sheets

(51) Int. Cl.
- *B29C 48/37* (2019.01)
- *B29C 48/25* (2019.01)
- *B29B 7/24* (2006.01)
- *C08J 3/02* (2006.01)
- *C08J 3/20* (2006.01)
- *B29C 48/08* (2019.01)
- *B29C 48/10* (2019.01)
- *B29C 48/09* (2019.01)
- *B29C 48/04* (2019.01)
- *B29B 9/10* (2006.01)
- *B29K 101/12* (2006.01)
- *B29K 105/00* (2006.01)
- *B29L 7/00* (2006.01)

(52) U.S. Cl.
CPC ............ *B29C 48/69* (2019.02); *C08J 3/02* (2013.01); *C08J 3/20* (2013.01); *B29B 9/10* (2013.01); *B29C 48/04* (2019.02); *B29C 48/08* (2019.02); *B29C 48/09* (2019.02); *B29C 48/10* (2019.02); *B29K 2101/12* (2013.01); *B29K 2105/0061* (2013.01); *B29L 2007/008* (2013.01)

(58) Field of Classification Search
USPC ...................................... 264/210.6
See application file for complete search history.

(56) References Cited

U.S. PATENT DOCUMENTS

| | | |
|---|---|---|
| 5,484,539 A | 1/1996 | Tersi et al. |
| 5,728,335 A | 3/1998 | Neubauer |
| 5,730,885 A | 3/1998 | Blakeslee et al. |
| 6,485,662 B1 | 11/2002 | Neubauer et al. |
| 7,393,916 B2 | 7/2008 | Neubauer et al. |
| 8,557,154 B2 | 10/2013 | Isaki et al. |
| 2005/0035051 A1 | 2/2005 | Kelly et al. |
| 2010/0022735 A1 | 1/2010 | Kanamori |
| 2013/0020247 A1 | 1/2013 | Saemann |
| 2013/0112609 A1 * | 5/2013 | Wostmann ............ B29C 48/694 210/314 |
| 2013/0176810 A1 | 7/2013 | Kuroda et al. |
| 2013/0181364 A1 | 7/2013 | Rasmussen |
| 2013/0188295 A1 * | 7/2013 | Chacko ................. C08G 75/06 361/525 |
| 2017/0305058 A1 | 10/2017 | Veariel et al. |

FOREIGN PATENT DOCUMENTS

| | | | |
|---|---|---|---|
| DE | 19728896 A1 * | 1/1999 | ............ B29C 45/17 |
| DE | 102006019445 A | 10/2007 | |
| EP | 0816047 | 1/1998 | |
| EP | 2952313 A | 12/2015 | |
| GB | 1386143 | 3/1975 | |
| JP | H09164580 A | 6/1997 | |
| WO | 01/47687 A | 7/2001 | |
| WO | 2013/137953 | 9/2013 | |

* cited by examiner

DEVICES, SYSTEMS, AND PROCESSES FOR PROCESSING POLYMERS

CROSS-REFERENCE OF RELATED APPLICATIONS

This application is a National Phase Application of International Application No. PCT/US2016/058615, filed Oct. 25, 2016, which claims the benefit of Ser. No. 62/268,135, filed Dec. 16, 2015, which are herein incorporated by reference in their entireties.

FIELD OF THE INVENTION

The disclosure relates to devices, systems and processes for processing polymers. In particular, the disclosure relates to devices that are capable of modifying undesirable characteristics or imparting desirable characteristics to polymers or compositions comprising the same.

BACKGROUND

Granular polyolefin resins produced in polymerization reactors are often compounded with conventional additives, such as ultraviolet stabilizers, antioxidants, antiblock agents, slip agents, processing aids, and other additives well-known in the art. With or without addition of such additives, granular resins are frequently pelletized for ease in handling, processing, and transportation. These processes may be carried out incorporating the use of extruders or mixers characterized by a feeding section where the granular resin is introduced to the extruder or mixer and conveyed through various processing zones in which the resin is fully (or partially) melted and mechanically mixed (typically by action of co- or counter-rotating, intermeshing or non-intermeshing twin screws, single screws, or rotors). The user might use this final form of the product for the secondary fabrication step or may require re-extrusion of the polymer to generate the final fabrication form, such as blown film, injection molded objects, etc. It is common to employ the use of a polymer melt pump (also called gear pump) to more efficiently generate the polymer pressure required to flow through the discharge section of the extrusion which typically includes, but not limited to, a screen changer (where screens are located if desired) and product-forming die plate. It is commercially undesirable to shut down the processing equipment to periodically change these screen devices as they foul over time. For this reason, so many processing lines utilize an automatic screen changer which provides for a quick exchange of screens (or screening devices) via a sliding plate arrangement. Exemplary processes are disclosed in WO 2013/137,953; U.S. Patent Application Publication No. 2013/0181364; and U.S. Pat. Nos. 5,728,335, and 8,557,154.

Undesirable characteristics of polyolefin resins which are processed in such extruders or mixers include inclusions generically termed "gels" that are apparent especially in films formed from such resins. In particular, the term "gels" refers to highly localized inclusions in the polymer, especially film made from polyolefins, which are visually distinct from the surrounding polymeric film. They are mostly due to the presence of either high concentrations of unblended polymer, polymer species different in molecular weight than the surrounding polymer matrix, unreacted catalyst and activator, product contaminants, cross-linked polymers, degraded polymers, and/or other types of visually distinct imperfections. The presence of gels generally lowers the value of such films, and in some cases makes the film unmarketable or not fit-for-use in the application. There have been many attempts in the past to solving this problem. One approach is to remove or reduce the size of the gels from the polyolefin material prior to forming the finished product through the use of screens/filters as discussed above. (See, for example, U.S. Pat. Nos. 5,730,885, 6,485,662; and U.S. Patent Application Publication No. 2007/0100132, issued as U.S. Pat. No. 7,393,916.)

Historically, polymer processors have inserted screen mesh filters (also called screen packs) into the process stream forcing the polymer to flow through the screen(s) to filter or break up undesired species from the primary polymer stream. The screens, though, can generate significant pressure drop and are limited by what the upstream system's equipment pressure rating can tolerate (or the pressure rating of the screen holder/device itself). Many of these contained species that are desired to be filtered or dispersed into smaller species are very small in nature (typically 400 microns or less) so the screens would need to have extremely small openings to act on these species, thus generating excessive pressure drop as a result. Likewise, the screens are often very thin in profile so the secondary species can potentially elongate, stretch, or deform in shape such that they can penetrate the screen device and re-emerge on the downstream side of the screen still intact.

Others have approached the problem using gel size reduction devices. For example, U.S. Patent Application Publication No. 2013/0176810 discloses, among other things, a gel size reduction device, comprising: a gel reduction mechanism provided in a polymer flow duct in which a polymer kneaded compound flows and adapted to reduce gel present in the polymer kneaded compound, the gel reduction mechanism includes at least one or more squeezing flow paths having a flow path cross-sectional area smaller than the polymer flow duct, and a squeeze ratio S1/S2 of the squeezing flow path is set to satisfy the following relationship to generate an extensional flow in the kneaded compound flowing in the squeezing flow path: squeeze ratio S1/S2 of the squeezing flow path=25 to 180 where S1: flow path cross-sectional area of the polymer flow duct and S2: sum total of flow path cross-sectional area of the squeezing flow path.

Figure 1:
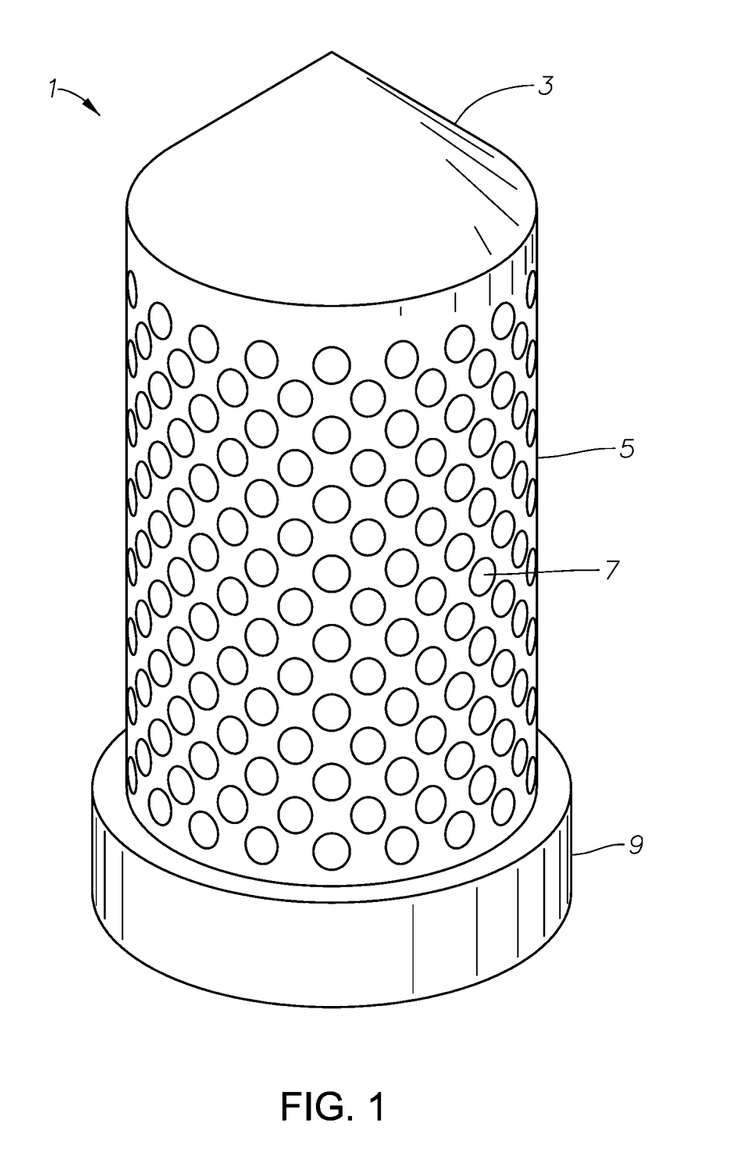
FIGS. 1-4 are depictions of devices in various embodiments of the invention.

In another approach, U.S. Ser. No. 62/081,921, filed Nov. 19, 2014, assigned to ExxonMobil Chemical Patents, Inc., discloses, among other things, a device for processing polymers comprising: a) an elongated body having a central axis; b) a plurality of inlet ducts parallel to the central axis; c) a plurality of outlet ducts parallel to the central axis; and d) a plurality of transition zones comprising one or more passages; wherein the one or more passages are not parallel to the central axis and provide fluid communication between at least one inlet duct and at least one outlet duct. FIG. 1 of U.S. Ser. No. 62/081,921 is a depiction of an example of such a device.

Background references also include U.S. Pat. No. 4,453,905, U.S. Patent Application Publication Nos. 2005/035051, 2010/022735, 2013/020247, GB 1 386 143 A, and EP 0 816 047 A.

Despite past endeavors, there remains a need for a solution for preparing polyolefin resins that can produce articles such as films that have no or reduced levels of gels or the ability to produce a polymer composition that includes a polymer matrix having a dispersed phase of a second polymer or resin component and/or one or more additives.

SUMMARY

In a class of embodiments of the invention, the invention provides for a device for processing one or more polymers comprising: a) a head member; b) an elongated body comprising a hollow section and having a longitudinal axis; b) a plurality of holes extending through at least one wall of the elongated body; and c) a secondary member; wherein the secondary member is in fluid communication with the elongated body.

In another class of embodiments of the invention, the invention provides for a polymer processing system comprising: a) at least one extruder or mixer; b) one or more of the device(s) described herein; c) at least one polymer processor; and d) at least one screen changer or at least one plate member; optionally wherein the one or more device(s) is placed in a fixed position in the at least one screen changer or the at least one plate member.

In yet another class of embodiments of the invention, the invention provides for a process for processing one or more polymers, the process comprising: a) obtaining one or more polymers; b) extruding or mixing the one or more polymers through at least one extruder or mixer, optionally, with at least one gear pump, to form a molten material; c) passing the molten material through one or more of the device(s) described herein; and d) optionally, pelletizing the molten material to obtain pellets or passing the molten material into a polymer processor to form an article.

Other embodiments of the invention are described and claimed herein and are apparent by the following disclosure.

DETAILED DESCRIPTION

Before the present devices, equipment, compounds, components, compositions, and/or methods are disclosed and described, it is to be understood that unless otherwise indicated this invention is not limited to specific devices, equipment, compounds, components, compositions, reactants, reaction conditions, or the like, as such may vary, unless otherwise specified or claimed.

It must also be noted that, as used in the specification and the appended claims, the singular forms "a," "an" and "the" include plural referents unless otherwise specified.

Classes of embodiments of the invention are directed to one or more devices and processes for processing one or more polymers, for example, polymers or resins (e.g., polyolefin polymers, elastomers, etc.).

In particular, the invention includes a device for processing one or more polymers comprising: a) a head member; b) an elongated body comprising a hollow section and having a longitudinal axis; c) a plurality of holes extending through at least one wall of the elongated body; and d) a secondary member; wherein the secondary member is in fluid communication with the elongated body.

In a class of embodiments, with reference to FIG. 1, the device 1 may comprise a) a head member 3; b) an elongated body 5 comprising a hollow section and having a longitudinal axis; c) a plurality of holes 7 extending through at least one wall of the elongated body; and d) optionally, at least one shoulder 9 parallel to the longitudinal axis.

Figure 2:
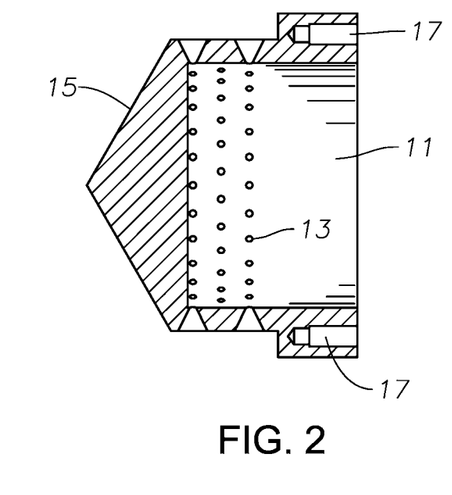

With reference to FIG. 2, the head member 15 may have a substantially conical shape and optionally taper away from the secondary member (not shown). The plurality of holes 13 may be observed and are placed through-out the elongated body 11. The device may also have a means 17 for securing itself to the plate member or screen changer, for example, using bolting.

Figure 3:
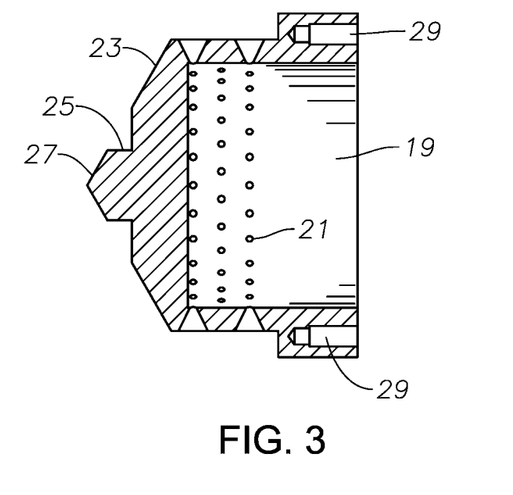

In another embodiment of the invention, with reference to FIG. 3, the head member 23 comprises a tip 27 and a tapered support member 25. The tip may have a polygon or a polyhedron shape, for example, a pentagon or hexagon shape. The tip may have a raised surface and may be substantially conical in shape. The plurality of holes 21 may be placed through-out the elongated body 19. The device may also have a means 29 for securing itself to the plate member or screen changer, for example, using bolting.

The design of the head member/elongated body should accomplish lower pressure drop and avoid stagnant flow of the material. The number of holes that are required (affected by flow per hole requirement) will likewise affect the shape (length) to accommodate the hole count.

In an embodiment, when the screen changer is opened (or the slide actuated), there may be considerable polymer surrounding the inventive device making it difficult to unscrew from the assembly. The hexagonal tip of the of the head member allows for easy disassembly. Of course, it represents only one of many techniques that could be applied to achieve removal.

Figure 4:
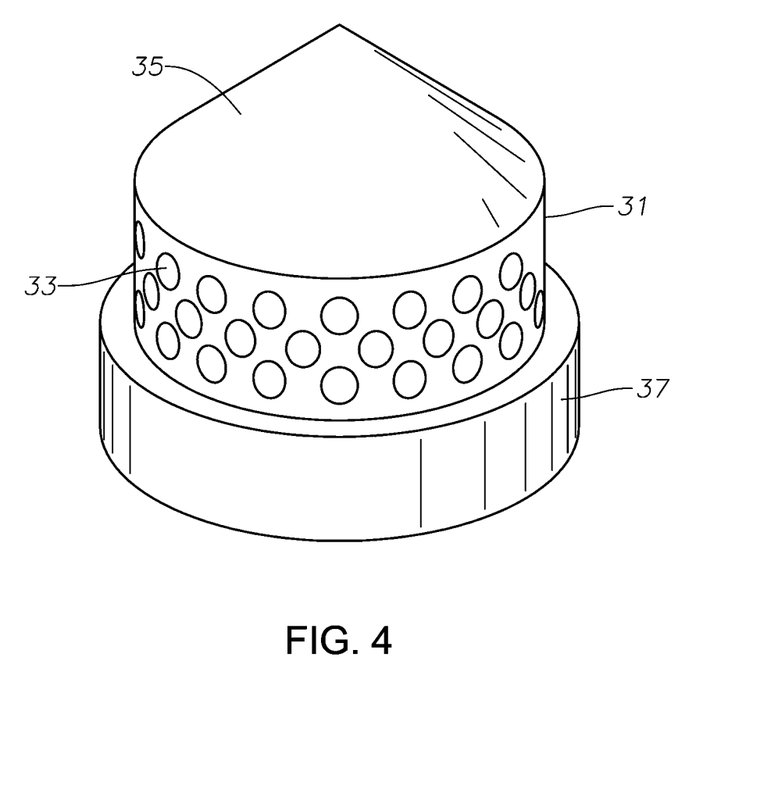

FIG. 4 illustrates the different proportions that may be applied in various embodiments of the invention as compared to FIG. 1. In FIG. 4, similarly, the device includes a) a head member 35; b) an elongated body 31 comprising a hollow section and having a longitudinal axis; c) a plurality of holes 33 extending through at least one wall of the elongated body; and d) optionally, at least one shoulder 37 parallel to the longitudinal axis but as shown in FIG. 4, the elongated body 31 has a much shorter length.

The secondary member may comprise a substantially conical depression and the substantially conical depression may taper away from the hollow section of the elongated body. The secondary member and the elongated member may be affixed together by at least one of fastening, bolting, crimping, welding, soldering, brazing, gluing, cementing, using an adhesive, 3-D printing, and any combination thereof. In some embodiments, two or more of the head member, the secondary member, or the elongated body may be fabricated into one piece.

In several classes of embodiments of the invention, the elongated body has a substantially cylindrical shape.

In any of the embodiments described herein, at least some of the plurality of holes may be substantially transverse to the longitudinal axis and/or situated at an angle to the longitudinal axis. The plurality of holes may be situated equidistant from each other along the outer surface of the elongated body or positioned randomly. The plurality of holes may cover 30% or greater, 40% or greater, 50% or greater, 60% or greater, 70% or greater, 75% or greater, 80% or greater, 85% or greater, or 90% or greater of the outer surface area of the elongated body. The plurality of holes may comprise, respectively to each hole, an inner aperture and outer aperture and the diameter of the outer aperture may be greater than the diameter of the inner aperture.

In another class of embodiments of the invention, the invention includes a polymer processing system comprising: a) at least one extruder or mixer; b) one or more of the device(s) as described herein; c) at least one polymer processor; and d) at least one screen changer or at least one plate member; optionally wherein the one or more device(s) is placed in a fixed position in the at least one screen changer or the at least one plate member. The system may be configured to process one or more polymers first in the extruder or the mixer, second, in the screen changer or plate member, and then to the polymer processor; wherein the system comprises a plurality of polymer molecular species and substantially all of the polymer molecular species pass through the system to the polymer processor.

The number of devices and the placement of the devices in the screen changer or plate member is a balance between having sufficient space between the devices to let the flow change direction (e.g., axial to radial) and enter the devices and to allow debris to accumulate without blocking an excess of holes prior to device change out. A "honeycomb" arrangement may be employed.

Figure 5:
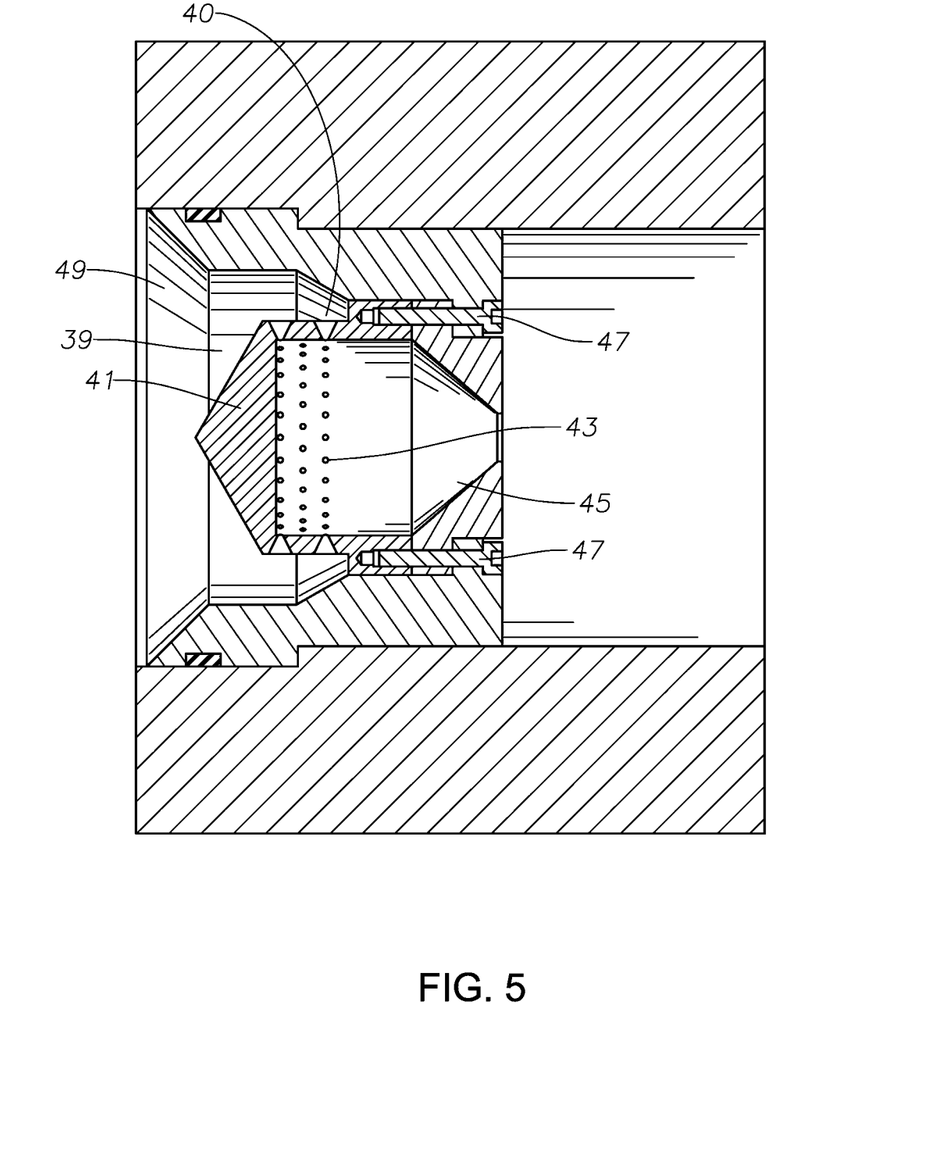
FIG. 5 is a representation of a cross-sectional view of an inventive device placed in a fixed position in a screen changer or plate member.

FIG. 5 is a representation of a cross-sectional view of a device 41 as described herein placed in a screen changer or plate member 40. The secondary member 45 is shown having a substantially conical depression and the substantially conical depression tapers away from the hollow section of the elongated body. Appropriate housing 49 is provided for the device 41 and the secondary member 45 to promote the flow of polymer beginning at the inlet flow zone 39. The plurality of holes 43 may be observed and are placed through-out the elongated body (not labeled). The device may also have a means 47 for securing itself to the plate member or screen changer 40, for example, using bolting.

In any of the embodiments described above, the one or more device(s) may be made from, at least partially or entirely, iron, steel, stainless steel, steel alloy, aluminum, aluminum alloy, titanium, titanium alloy, or mixtures thereof, and is optionally, polished and/or coated. Choice of materials and treatment is dictated by process and product requirements and conditions.

In yet another class of embodiments of the invention, the invention includes a process for processing one or more polymers, the process comprising: a) obtaining one or more polymers; b) extruding or mixing the one or more polymers through at least one extruder or mixer, optionally, with at least one gear pump, to produce substantially a molten material; c) passing the molten material through one or more of the device(s) as described above; and d) optionally, pelletizing the molten material to obtain pellets or passing the molten material into to at least one polymer processor to form an article.

In the embodiment described above, the one or more polymers may comprise polyolefin polymers, other thermoplastic polymers, elastomers, or mixtures thereof, for example, polyethylene polymers, polypropylene polymers, or mixtures thereof. Exemplary articles include films, sheets, etc.

The at least one polymer processor may be selected from at least one of a pelletizer, a blow molding device, a roto molding device, an injection molding device, a cast film device, a blown film device, and coextrusion device.

In any of the embodiments described above, the substantially molten material entering the one or more device(s) may comprise gels and the average gel size is reduced and/or the gels are more dispersed after passing the substantially molten material through the device. For example, the substantially molten material entering the one or more device(s) may comprise gels and/or a secondary polymer species and the average gel size may be reduced by or the average secondary specie dispersivity may be increased by at least 25%, at least 35%, at least 50%, at least 55%, at least 65%, or at least 75% after passing the substantially molten material through the device. As used herein, "dispersivity" generally refers to either the separation into separate species from a common accumulation of species or reduction of a single species into smaller species.

In any of the embodiment described above, the process may include two or more different polymers, optionally, with additives, and the two or more polymers and optional additives may be more dispersed in the substantially molten material after passing through the one or more device(s).

In any of the embodiment described above, the two more different polymers may comprise a polyolefin polymer and a cured elastomer and the polyolefin polymer may form a polymer matrix and the cured elastomer may form a dispersed phase in the polymer matrix.

As stated above, one or more polymers may comprise polyolefin polymers, other thermoplastic polymers, elastomers, and mixtures thereof. In some embodiments, the polyolefin polymers may comprise polyethylene polymers, polypropylene polymers, or elastomers, or mixtures thereof (including homopolymers, copolymers, terpolymers, interpolymers, etc.).

In several classes of embodiments of the invention, the inventive device accelerates the polymer and secondary species or component, for example, gels or another secondary component, through a geometric opening specifically designed such that the secondary species cannot elongationally withstand the forces acting on it and disperses into smaller species, for example, smaller particles. As used herein, "secondary component" or "secondary specie(s)" refers to any material present in a minority amount in another material. Ideally, this is accomplished, at least in party, via a geometric design of the device at a minimal increase in pressure drop as compared to conventional screen technology, for example, a standard screen, typically, 12-400 mesh screens, used for commercial processing. In a class of embodiments of the invention, the process is directed at reducing the size of the gels in the polymer molten material or providing better dispersion of the gels in the polymer molten material. In particular, the molten material entering the device comprises gels and the average gel size is reduced after passing the molten material through the device. Thus, the secondary component, for example, the smaller gels, will typically still remain but in much smaller domain sizes. For example, the average gel size of the secondary component is reduced by at least 30% after passing the molten material through the device, alternatively, by at least 40% after passing the molten material through the device, alternatively, by at least 50% after passing the molten material through the device, alternatively, by at least 60% after passing the molten material through the device, alternatively, by at least 70% after passing the molten material through the device, alternatively, by at least 80% after passing the molten material through the device, and alternatively, by at least 90% after passing the molten material through the device.

In another class of embodiments of the invention, the process is directed at dispersing one or more secondary materials or components in a polymer matrix. In particular, in these embodiments, one or more different polymers, optionally, with one or more additives, form a polymer composition comprising a polymer matrix having a dispersed phase including a second polymer component, third polymer component, etc. and/or one or more additives. The polymer composition having a polymer matrix and dispersed phase may be produced by passing the molten material through the device to produce the polymer composition. For example, the molten material may comprise a polyolefin polymer, such as a polyethylene polymer or polypropylene polymer, and secondary polymer component, such as a different polymer or a cured rubber typically in the form of pieces or particles. The molten material, optionally, with one or more additives, may be passed through the device as described herein to form a polymer matrix of the polyolefin polymer and the secondary polymer component and/or the additives form the dispersed phase in the matrix.

The one or more devices or any of its components or associated equipment described herein may be machined, produced using 3-D printing, polished, coated, texturized, etched, etc. The one or more devices are most cost-effective if they are designed to fit into conventional equipment. The device may be contained within a metal holder, for example, a screen changer, or nested in a sleeve or break plate that forces the polymer material through the one or more devices and requires the polymer material to accelerate through the devices. The metal holder may be made out of the same or different material as the device. The one or more devices should be designed and tailored to match the rheological behavior of the polymer material. For example, embodiments of the device of the invention use rheological extensional and elongational behavior/forces such that the secondary component cannot survive the flow environment in its inlet form. As such, each device should be designed based upon on the rheological characteristics of the polymer/secondary component. Thus, adjustments to the device are typical to match the device to the polymers processed. For example, polyethylene may have a different device design than polypropylene or an elastomer.

Since the device(s) are intended for use in commercial extrusion lines, minimization of pressure drop throughout the device(s) is desirable. Ideally, implementation of the one or more device should not exceed the pressure rating of the discharge system components, should not be economically rate-limiting, and should not foul quickly, thus, requiring frequent line outage for change-out. Thus, the device(s) should be geometrically designed to minimize pressure drop while maximizing extensional forces on the gel or secondary component, for example, secondary polymer component and/or one or more additives. This is at least one advantage over using conventional screens as filters. For example, a primary goal of filtration is the removal of undesirable components in a polymer material. However, due to the inherent nature of the use of screens, the extrusion process will inevitably suffer from a pressure drop. For example, pressure is required to enable the flow of a liquid past an obstruction, i.e., the filter. The more restrictive the obstruction, the more pressure is required to force the flow of the liquid through the obstruction. This pressure drop is limiting to production rates and energy efficiency when using conventional screen technology. Thus, it is desirable to generate minimum pressure drop in the extrusion process so as to not become rate-limiting or exceeding the allowable operating pressure of the polymer processing system. Additionally, in order to get equivalent rheological forces on the polymer and secondary species, acceleration through the device needs to be controlled. In comparison, conventional screen technology cannot achieve such control of acceleration without getting excessively restrictive on polymer flow. Similarly, screens with simple holes or capillaries suffer from high pressure drops and little to no acceleration of the material.

In contrast, processes employing the device(s) disclosed herein do not attempt to remove gels or the secondary component but they alter or modify the gels or secondary component to allow them to pass through the polymer processing system in modified form to produce a desirable product. Thus, in several classes of embodiments, this approach offers advantages over the use of conventional screens in filtration by mitigating the problems associated with pressure drop.

For commercial applications, it is envisioned that more than one device may be applied per processing line. The number of devices may be set by the flow, how small an opening is required for the elongational effect, and how many openings are needed to achieve the effect without excessive pressure drop, etc. Pressure drop is affected by the flow through the hole so the higher the flow and the more restrictive the element, the more openings are needed to keep the flow per opening low. In a class of embodiments, multiple devices are designed to fit into a single screen changer arrangement that is used with commercial extruders available from several extrusion equipment suppliers. The screen holders and screens are removed and replaced with the devices described herein due to element fouling approaches and allowable pressure limits.

Ideally, the screen changer may be modified with little effort to incorporate the devices into a commercial line. In particular, some extrusion trains or mixer trains use gear pumps located between the extruder (or mixer) and the pelletizer. Inventive devices as described herein may be used either before and/or after the gear pump in an extruder system. In an embodiment, for a twin-screw extruder with at least one gear pump, the one or more devices may be placed downstream of the gear pump.

For these applications, it is expected that since the outer device holders are of solid construction, there is a potential for polymer flow dead zones that could encourage polymer hold-up and degradation. The devices must be arranged physically to fit within the dimensions of the screen changer slide plate. This facilitates use of multiple devices without redesign of the standard screen changer. Accordingly, this arrangement should provide for use with equipment currently commercially available with little to no modification of the commercial equipment.

Additionally, not all polymer grades processed on an extrusion line needs to be subjected to the extensional forces of the device. Therefore, in several embodiments, the one or more devices may be configured to be retracted from the polymer processing system without significant downtime between grades benefitting from the device versus those that do not require it.

General Polymer Processing

However, before the molten material may be passed through the one or more devices as described above, the polymer or resin material typically is heated to at least its melting point, usually, by being passed through an extruder or mixer. It should be noted that although the polymer matrix material is heated to its melting point or to some greater temperature, other components present in the matrix may or may not be molten. In particular, the process generally includes melt blending a polymer composition through an extruder or mixer, extruding the polymer composition through a die, and then cooling the polymer composition or passing the molten material directly to downstream processes that form articles, such as films. (See, for example, U.S. Pat. Nos. 4,814,135, 5,076,988, 5,153,382, 5,728,335, and U.S. Patent Application Publication No. 2005/0012235).

Typically, polymer granules are melted via the main drive energy input and the work imparted via extruder screws or mixer rotors. The polyolefin may be further blended, and is ideally blended as well as melted in a sequential or simultaneous process in the same instrument. The melting, blending or "melt blending" may take place with extruders (or mixers) and processes for extrusion as listed in the references above. For example, one can use extruders, either twin-screw type, for example, a Coperion ZSK co-rotating twin-screw extruder, or a single-screw extruder (such as those available from Japan Steel Works, Farrel Corporation, Berstorff, etc.)

For some applications, the screw portion of the single-screw extruder may be divided up into three sections: the feed section, the compression section, and the metering section, optionally, with a final mixing head at the end of the screw. It may have multiple heating zones from the rear heating zone to the front heating zone, the multiple sections and zones running from upstream to downstream. If the extruder has more than one barrel, the barrels ideally may be connected in series. The length to diameter ratio of each barrel may be in the range of 16:1 to 40:1. Blending of the polymer may also be accomplished, for example, in a batch type mixer such as a BANBURY™ or a BRABENDER™ mixer. Tangential and intermeshing counter-rotating and intermeshing co-rotating mixers, two stage mixers, and multistage long length/diameter mixers may also be used. (See, for example, U.S. Pat. Nos. 4,334,783 and 5,458,474). The blending may take place at temperatures in the range from 160 to 270° C., in particular, carried out at temperatures in the range from 180 to 240° C.

The blending step is followed by passing the molten polymer material through one more devices. Ideally, the rheological behavior of the gel, for example, the specific molecular and extensional flow behavior of the gel, must be matched with the geometry of the one or more devices such that the gel is subjected to extensional flow forces that breaks up the gels into smaller domain sizes. Further quality control analysis may occur to assess product quality, for example, using an OCS gel counter to assess film quality off-line.

The quantity of "gels", or gel "rating", may be determined using an OCS Gel Counting Apparatus. The OCS Gel Counting Line typically consists of the following pieces of equipment:

1) Brabender Extruder with a ¾ inch 20:1 L/D compression screw;
2) Adjustable film slit die;
3) OCS model FS3; and
4) Killion chill roll and a film take-up system.

The OCS system evaluates slightly over 1.0 m² of film per test. The targeted film thickness is 76.2 μm (0.003 inch or 3.0 mil). The OCS Model FS3 camera has a resolution of 7 μm and reads a film width of 12 mm and the system identifies 10 class sizes of gels as listed below:

7 to 54 μm,
55 to 100 μm,
101 to 200 μm,
201 to 300 μm,
301 to 400 μm,
401 to 500 μm,
501 to 600 μm,
601 to 800 μm,
801 to 1600 μm,
greater than 1600 μm.

The OCS system, at the completion of each test, generates a summary of the gel data per 1.0 m² of film. A Composite Gel Count is reported. This rating is calculated as:

$$\text{Composite Gel Count} = 0.1 \times \text{Gel Count (101 to 200μm)} + 1.0 \times \text{Gel Count (201 to 500 μm)} + 10 \times \text{Gel Count (Gels greater than 501 μm)}.$$

This Composite Gel Count roughly approximates how a film customer will react to gels in the film, with lower Composite Gel Counts being better and able to produce more desirable and marketable films. The composite gel count applies a higher "penalty" or weighted value for larger gels, because they are more visible and more likely to cause problems in the final product.

In several classes of embodiments, the Composite Gel Count for a film produced from a polymer composition that had been processed by a polymer processing system comprising one or more of the inventive devices would be 100 or less, alternatively, 75 or less, alternatively, 50 or less, alternatively, 40 or less, alternatively, 35 or less, alternatively, 30 or less, alternatively, 25 or less, alternatively, 20 or less, and alternatively, 10 or less.

Without being bound to theory, it is believed that as the polymer material containing gels passes through the one or more devices, it undergoes a significant acceleration in velocity, extensional forces are generated that the gels cannot withstand, and separates or disperses the gel into smaller particles. The flow may be simulated using FLUENT™ polymer flow software to calculate flow, pressure drop, etc. Although this phenomena is applicable to gel separation or dispersion, it is believed to be equally applicable to dispersing any secondary component such as a secondary polymer component.

In some embodiments of the invention, this step may be also accompanied by passing the molten polymer material through at least one screen, which may be housed in a breaker plate. It will be understood that the term "screen(s)" includes screens, sieves, and other filter media. The active screens can be, for example, square weave wire screens and/or Dutch weave wire screens. The screens may have different shapes with various openings, for example, triangular openings or round openings and regular or irregular shapes. The use of screens is well known and exemplary descriptions of various screens and their use may be found in U.S. Pat. Nos. 5,730,885, 6,485,662; and U.S. Patent Application Publication No. 2007/0100132, issued as U.S. Pat. No. 7,393,916. In some embodiments, it may be useful to pre-screen the polymer stream for large debris prior to contact with the device to help diminish the chance for device fouling. In such embodiments, an upstream or inlet screen may be applied.

Polymers and Additives

In some embodiments of the invention, the polymers to be processed are one or more of the same or different polymers or resins, elastomers, and mixtures thereof. The polyolefin polymers may comprise polyethylene polymers, polypropylene polymers, or mixtures thereof (including homopolymers, copolymers, terpolymers, interpolmers, etc.). The polyolefin polymer may be any polymer comprising at least 40 to 100% by weight of olefin derived units, preferably α-olefin derived units. Most preferably, the olefin derived units are from ethylene and/or propylene and other α-olefins selected from the group consisting of $C_3$ to $C_{12}$ α-olefins, including, linear, cyclic and substituted olefins.

In some embodiments of the invention, a polyethylene resin can be a polyethylene homopolymer or copolymer of ethylene and one or more $C_3$-$C_{20}$ alpha-olefin comonomers. As used herein, the term "ethylene copolymer" indicates a polymer formed from more than 50 wt % polymerized ethylene units, and the remaining less than 50 wt % polymerized units being polymerized α-olefin comonomers, such as $C_3$-$C_{20}$ α-olefins, more particularly, $C_3$-$C_{12}$ α-olefins, such as butene and/or hexene. Other suitable α-olefin comonomers may be linear or branched, and two or more comonomers may be used, if desired. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

Additionally, for bimodal polymer compositions, the devices described herein may be very useful. For example, one of the disadvantages of bimodal polymer compositions can be the formation of two distinctly separate polymer species where the secondary component is not properly dispersed in the bimodal polymer composition. Under such circumstances, the two distinct species without proper dispersion can negatively impact processing or ultimate product properties if not dispersed properly. For these applications, the one or more devices described herein may be very useful in dispersing the secondary component in the bimodal polymer composition so as to mitigate the problems described above. Bimodal compositions may be made from PRODIGY™ Bimodal Catalysts available from Univation Technologies, LLC, Houston, Tex.

The polymer material may also be blended with one or more additives. Conventional additives that may be introduced include without limitation antioxidants, ultraviolet absorbers, antistatic agents, pigments, dyes, nucleating agents, fillers, slip agents, fire retardants, plasticizers (for example, polyalphaolefins, phthalates, benzoates, adipates, cyclohexanoates, etc.), processing aids, lubricants, stabilizers, smoke inhibitors, viscosity control agents, crosslinking agents, catalysts, boosters, tackifiers, anti-blocking agents, and any combination thereof.

In one embodiment, an oxidizing agent is also added during the melting step as a reactive component with the polymer. In this embodiment, the polymer stream is extruded with an oxidizing agent, preferably, an oxygen-containing gas, such as air. After subjecting the polymer stream to the oxidation reaction, it may be passed through one or more of the devices described herein to disperse the modified polymeric species in the matrix.

End Use Applications

The polymer material may be further processed to form a film. The films may be any film including cast films or blown films. The films may be further embossed or processed according to other known film finishing processes. The films may be tailored to specific applications by adjusting the thickness, materials, and order/type of the various layers, as well as the additives in each layer. The films may be monolayer or multilayer films. Further, films may be used in any typical film application, such as stretch films, shrink films, packaging films, bags, geo membranes, liners, and other film applications known in the art.

The polymer material may be processed, with or without additives as described above, by any suitable means for forming films: film blowing or casting and all methods of film formation to achieve, for example, uniaxial or biaxial orientation.

Any extruder suitable for extrusion of polymer material operating under any desirable conditions may be used to produce the films. Extruders and processes for extrusion are described in, for example, U.S. Pat. No. 4,169,67. Examples of various extruders, that may be used in forming the film are a single screw type such as one modified with a blown film die and air ring and continuous take off equipment, a blown film extruder, and a slot cast extruder. Twin screw extruders may also be used. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections: the feed section, the compression section, and the metering section. It may have multiple heating zones from the rear heating zone to the front heating zone, the multiple sections and zones running from upstream to downstream.

If it has more than one barrel, the barrels are typically connected in series. Twin-screw extruders are typically comprised of multiple barrels connected in series typically forming an overall L/D ratio of 8:1 up to 36:1. Shorter or longer L/D ratios are possible and are dependent on the processing action required in the extruder. Single-screw extruders can be comprised of one or more barrels likewise dependent upon the processing requirement. The extrusion typically takes place at temperatures in the range from 180 to 300° C. but is dependent on the polymer being processed and the operating conditions of the machine. The range of application of the device can vary to be used with any extruder system known in the art including but not limited to single, twin, or multiple screw extruders in any useful combination or configuration.

In one embodiment, a grooved feed extruder may used. The extruder may possess a L/D ratio of from 80:1 to 2:1 in one embodiment, alternatively, from 60:1 to 6:1 in another embodiment, alternatively, from 40:1 to 12:1 in yet another embodiment, and alternatively from 30:1 to 16:1 in yet another embodiment.

A mono or multi-layer die may be used. In one embodiment, a 50 to 200 mm monolayer die may be used, alternatively, a 90 to 160 mm monolayer die in another embodiment, and alternatively, a 100 to 140 mm monolayer die in yet another embodiment. The die may have a nominal die gap ranging from 0.6 to 3 mm in one embodiment, alternatively, from 0.8 to 2 mm in another embodiment, and alternatively, from 1 to 1.8 mm in yet another embodiment, wherein a desirable die may be described by any combination of any embodiment described herein.

In a class of embodiments of the invention, the polymer material may be processed to form a cast film. Processes to form cast films are well-known. For example, a polymer material may be extruded in a molten state through a flat die and then cooled to form a film. As an example, cast films may be prepared using a pilot scale commercial cast film line machine as follows. Pellets of the polymer material are melted at a temperature ranging from 250° C. to 300° C., with the specific melt temperature typically being chosen to match the melt viscosity of the particular polymer. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The polymer material is then drawn down to the final gauge. The material draw down ratio is typically about 21:1 for 0.8 mil (20 μm) films. A vacuum box or air knife may be used to pin the melt exiting the die opening to a primary chill roll maintained at about 90° F. (32° C.). The resulting polymer film is collected on a winder. The film thickness may be monitored by a gauge monitor, and the film may be edge trimmed by a trimmer. One or more optional treaters may be used to surface treat the film, if desired. Such chill roll casting processes and apparatus are well known in the art. Although chill roll casting is one example, other forms of casting may be used.

In another class of embodiments of the invention, the polymer material may be processed to form a blown film. Processes to form blown films are well-known. For example, the polymer material may be extruded in a molten state through an annular die and then blown and cooled to form a tubular, blown film, which can then be axially slit and unfolded to form a flat film. As an example, blown films may be prepared as follows. The polymer material is conveyed to an extruder, such as a 63.5 mm Egan extruder that is water-cooled, resistance heated, and has an L/D ratio of 24:1. The film may be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed, and optionally subjected to a desired auxiliary process, such as slitting, treating, sealing, or printing. The finished film may be wound into rolls for later processing or can be fed, for example, into a bag machine and converted into bags or other articles. Of course, other blown film forming methods may also be used.

In other embodiments, the polymer material may be further processed by injection molding to form an injection-molded article. Methods of injection molding are well-known in the art.

In yet other embodiments, the polymer material may be further processed by blow molding to form a blow-molded article. Methods of blow molding are well-known in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A device for processing one or more polymers comprising:

a) a head member;

b) an elongated body comprising a hollow section and having a longitudinal axis;

c) a plurality of holes extending through at least one wall of the elongated body, wherein each hole of the plurality of holes is designed such that a polymer and a secondary component processed through the device would be accelerated to cause the secondary component to be dispersed into smaller species; wherein at least some of the plurality of holes are substantially transverse to the longitudinal axis, or are situated at an angle to the longitudinal axis, wherein the plurality of holes comprises, respectively to each hole, an inner aperture and outer aperture, and further wherein the diameter of each outer aperture is greater than the diameter of each inner aperture; and d) a secondary member in fluid communication with the elongated body, wherein the secondary member comprises a substantially conical depression and the substantially conical depression tapers away from the hollow section of the elongated body.

2. The device of claim 1, wherein the secondary member and the elongated member are affixed together by at least one of fastening, bolting, crimping, welding, soldering, brazing, gluing, cementing, using an adhesive, and any combination thereof.

3. The device of claim 1, wherein two or more of the head member, the secondary member, or the elongated body are fabricated into one piece.

4. The device of claim 1, wherein the head member has a substantially conical shape and tapers away from the secondary member.

5. The device of claim 1, wherein the head member comprises a tip and a tapered support member.

6. The device of claim 5, wherein the tip has a polygon or a polyhedron shape.

7. The device of claim 6, wherein the tip has a pentagon or hexagon shape.

8. The device of claim 5, wherein the tip has a raised surface.

9. The device of claim 8, wherein the raised surface is substantially conical in shape.

10. The device of claim 1, wherein the elongated body has a substantially cylindrical shape.

11. The device of claim 1, wherein the plurality of holes are situated equidistant from each other along the outer surface of the elongated body.

12. The device of claim 1, wherein the plurality of holes covers 30% or greater of the outer surface area of the elongated body.

13. A polymer processing system comprising:

a) at least one extruder or mixer;

b) one or more of the device(s) of claim 1;

c) at least one polymer processor; and d) at least one screen changer or at least one plate member;

optionally, wherein the one or more device(s) is placed in a fixed position in the at least one screen changer or the at least one plate member.

14. The polymer processing system of claim 13, wherein the system is configured to process one or more polymers first in the extruder or the mixer, second, in the screen changer or plate member, and then to the polymer processor; wherein the system comprises a plurality of polymer molecular species and substantially all of the polymer molecular species pass through the system to the polymer processor.

15. The polymer processing system of claim 13, wherein at least one polymer processor is selected from at least one of a pelletizer, a blow molding device, a roto molding device, an injection molding device, a cast film device, a blown film device, and coextrusion device.

16. A process for processing one or more polymers, the process comprising:
   a) obtaining one or more polymers;
   b) extruding or mixing the one or more polymers through at least one extruder or mixer, optionally, with at least one gear pump, to form a molten material;
   c) passing the molten material through one or more of the device(s) of claim 1; and
   d) optionally, pelletizing the molten material to obtain pellets or passing the molten material into a polymer processor to form an article.

17. The process of claim 16, wherein the one or more polymers comprise polyolefin polymers, other thermoplastic polymers, elastomers, or mixtures thereof.

18. The process of claim 16, wherein the article is a film.

19. The process of claim 17, wherein the polyolefin polymers comprise polyethylene polymers, polypropylene polymers, or mixtures thereof.

20. The process of claim 16, wherein the substantially molten material entering the one or more device(s) comprises gels and the average gel size is reduced and/or the gels are more dispersed after passing the substantially molten material through the device.

21. The process of claim 16, wherein the substantially molten material entering the one or more device(s) comprise gels and/or a secondary polymer species and the average gel size is reduced by or the average secondary specie dispersivity is increased by at least 50% after passing the substantially molten material through the device.

22. The process of claim 16, wherein the process includes two or more different polymers, optionally, with additives, and the two or more polymers and optional additives are more dispersed in the substantially molten material after passing through the one or more device(s).

* * * * *